United States Patent
Clark (10) Patent No.: US 7,288,930 B2
(45) Date of Patent: *Oct. 30, 2007

(54) WHEEL-SPEED SENSOR

(75) Inventor: Edward Russell Clark, Monroeville, OH (US)

(73) Assignee: Siemens VDO Automotive Corporation, Auburn Hills, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/137,139

(22) Filed: May 25, 2005

(65) Prior Publication Data

US 2006/0001417 A1    Jan. 5, 2006

Related U.S. Application Data

(63) Continuation of application No. 10/328,690, filed on Dec. 23, 2002, now Pat. No. 6,911,817.

(51) Int. Cl.
*G01P 3/44* (2006.01)
*G01R 33/07* (2006.01)

(52) U.S. Cl. ............... 324/174; 324/207.25; 324/207.2

(58) Field of Classification Search ................. 324/174
See application file for complete search history.

(56) References Cited

U.S. PATENT DOCUMENTS

| | | | | |
|---|---|---|---|---|
| 4,150,314 A | * | 4/1979 | Zabler et al. | 310/155 |
| 4,887,027 A | * | 12/1989 | Strasser | 324/117 H |
| 4,969,753 A | * | 11/1990 | Kato et al. | 384/448 |
| 5,293,124 A | * | 3/1994 | Caillaut et al. | 324/173 |
| RE35,703 E | * | 12/1997 | Koch et al. | 324/230 |
| 6,552,534 B2 | * | 4/2003 | Desbiolles et al. | 324/207.25 |
| 6,838,871 B2 | * | 1/2005 | Taneyhill | 324/174 |
| 6,911,817 B2 | * | 6/2005 | Clark | 324/174 |
| 2003/0160605 A1 | * | 8/2003 | Michalek et al. | 324/174 |

FOREIGN PATENT DOCUMENTS

EP              670471  A1 *  9/1995

* cited by examiner

*Primary Examiner*—Anjan Deb
(74) *Attorney, Agent, or Firm*—Carlson Gaskey & Olds PC (57) ABSTRACT

Unlike known wheel-speed sensors, the wheel-speed sensor in accordance with the present invention is readily serviceable without disassembly of major components of the wheel assemblies and is relatively simple, and thus less expensive to manufacture, than known wheel-speed sensors. Two embodiments of the wheel-speed sensor in accordance with the present invention are disclosed. One embodiment relates to a "between-the-rows" wheel-speed sensor which includes a magnetic exciter ring that is adapted to be affixed to a rotating axle between rolling element rows of a wheel bearing. In an alternate embodiment of the invention, the wheel-speed sensor is configured to form a grease seal which typically inserts into the end of an axle tube. A wheel-speed sensor utilizes a multiple pole magnetic exciter ring that is adapted to be attached to a rotating axle shaft. The wheel-speed sensor includes a two-piece stator which also functions as a grease seal which concentrates flux from a rotating multiple pole exciter ring. A coil of magnet wire or, alternatively, an active Hall effect device is used as the sensor and connects the two stator pieces, forming a flux bridge.

13 Claims, 10 Drawing Sheets

WHEEL-SPEED SENSOR

CROSS-REFERENCE TO RELATED APPLICATIONS

This application is a continuation of U.S. patent application Ser. No. 10/328,690, filed on Dec. 23, 2002, now U.S. Pat. No. 6,911,817, incorporated herein by reference.

BACKGROUND OF THE INVENTION

1. Field of the Invention

The present invention relates to a wheel-speed sensor and, more particularly, to a wheel-speed sensor that can be more readily serviced, for example, without removal of a wheel axle or oil seal, unlike known wheel-speed sensors, and is relatively less complicated and less expensive to manufacture.

2. Description of the Prior Art

Wheel-speed sensors are known in the art. Such wheel-speed sensors are known to be used in vehicle applications for providing signals representative of the wheel-speed of the individual wheels on the vehicle. These wheel-speed signals are known to be used in anti-lock brake systems.

Examples of such wheel-speed sensors are disclosed in U.S. Pat. Nos. 5,537,032; 5,191,284; 5,293,124; and 5,476,272. U.S. Pat. Nos. 5,537,032; 5,191,284; and 5,293,124 relate to wheel-speed sensors which are integrated with a wheel-bearing assembly. U.S. Pat. No. 5,476,272, on the other hand, relates to a wheel-speed sensor that is integrally formed with an axle oil seal.

Referring first to U.S. Pat. Nos. 5,537,032; 5,191,284; and 5,293,124, these patents, as mentioned above, all relate to wheel-speed sensors which are integrated with wheel-bearing assemblies. U.S. Pat. No. 5,537,032 relates to a "between-the-rows" wheel-speed sensor, while U.S. Pat. Nos. 5,191,284; and 5,293,124 are wheel-speed sensors which are not disposed "between-the-rows" of a wheel-bearing assembly. Referring first to U.S. Pat. No. 5,537,032, this patent, as mentioned above, relates to a "between-the-rows" wheel-speed sensor which includes a magnetic exciter ring formed with alternating magnetic poles disposed between rolling element rows of a wheel-bearing. The magnetic exciter ring is formed from a ferro-magnetic material and is configured with a plurality of radially spaced tooth pairs. Each tooth pair is formed from a pair of axially spaced teeth forming a concentric notch relative to a magnetic exciter ring for receiving a variable reluctance sensor. A pole piece, configured in the same shape as the annular notch formed by the radially spaced tooth pairs, provides contour coupling between the magnetic exciter ring and the variable reluctance sensor. In operation, as the ferro-magnetic exciter ring rotates, electrical voltage pulses are induced in the variable reluctance sensor. The frequency of the pulses is representative of the wheel-speed.

There are several problems with the wheel-speed sensor disclosed in the '032 patent. For example, the wheel-speed sensor disclosed in the '032 patent requires a rather complicated magnetic exciter ring structure. Moreover, the serviceable portion of the sensor is located on the back side of the wheel mounting flange, thus requiring removal of the axle and/or oil seal for servicing.

U.S. Pat. Nos. 5,191,284; and 5,293,124 also relate to wheel sensors and are also configured to be integrated with a wheel-bearing assembly. In particular, U.S. Pat. No. 5,191,284 discloses a wheel-speed sensor which includes a generally C-shaped support that is adapted to be rigidly attached to a rotating inner ring of a wheel-bearing assembly. The C-shaped support is used to carry a pair of radially spaced-apart, magnetized rings forming an annular notch therebetween. A sensor which includes an extending pole piece is disposed within the notch. Thus, as the inner rotating ring rotates, the magnetic sensor is exposed to different magnetic poles, thus generating a signal representative of the wheel-speed.

U.S. Pat. No. 5,293,124 also discloses a wheel-speed sensor integrally formed with a wheel bearing. The wheel-speed sensor disclosed in the '124 patent is similar to the embodiment disclosed in the '284 patent, except that it discloses a single magnetic exciter ring formed from alternating North and South magnetic poles. Unfortunately, the wheel-speed sensors disclosed in both U.S. Pat. Nos. 5,191,284; and 5,293,124 suffer from the same problems as the wheel-speed sensor disclosed in U.S. Pat. No. 5,537,032. In particular, servicing of the sensor disclosed in U.S. Pat. Nos. 5,191,284; and 5,293,124 requires removal of the wheel bearing—a relatively cumbersome and labor-intensive task. In addition, the configuration of the exciter rings disclosed in U.S. Pat. Nos. 5,191,284; and 5,293,124 is relatively complex, thus requiring relatively expensive manufacturing. Thus, there is a need for a wheel-speed sensor that is easily serviceable and is less complicated and thus less expensive to manufacture than known wheel-speed sensors.

SUMMARY OF THE INVENTION

The present invention relates to a wheel-speed sensor for generating signals representative of the wheel speed of an individual wheel on a vehicle. Unlike known wheel-speed sensors, the wheel-speed sensor in accordance with the present invention is readily serviceable without disassembly of major components of the wheel assemblies and is relatively simple, and thus less expensive to manufacture, than known wheel-speed sensors. Two embodiments of the wheel-speed sensor in accordance with the present invention are disclosed. One embodiment relates to a "between-the-rows" wheel-speed sensor which includes a magnetic exciter ring that is adapted to be affixed to a rotating axle and disposed between the rolling element rows of a wheel bearing. The magnetic exciter ring is configured with alternating magnetic poles. An active magnetic sensor, such as a Hall effect device, is radially disposed away from the magnetic exciter ring and includes a pole piece or flux concentrator that is disposed directly over the sweet spot of the magnetic exciter ring. A second flux concentrator or magnetic shunt is positioned on the other side of the active device, providing a magnetic ground for the circuit. In lieu of a Hall effect device, a coil of wire can be utilized to form a variable reluctance or passive device. In an alternate embodiment of the invention, the wheel-speed sensor is configured to form a grease seal which typically inserts into the end of an axle tube. This wheel-speed sensor utilizes a multiple pole magnetic exciter ring that is adapted to be attached to a rotating axle shaft. The wheel-speed sensor includes a two-piece stator which also functions as a grease seal which concentrates flux from the rotating multiple exciter ring. A coil of magnet wire or, alternatively, an active Hall effect device, is used as the sensor and connects the two stator pieces, forming a flux bridge. As magnetic flux is conducted across the bridge, the magnetic circuit is completed from North magnetic poles to adjacent South magnetic poles. As this happens, the magnetic flux surrounding the flux bridge induces an alternating electrical current in the coil or provides a reversing magnetic flux to an active device in order to provide a wheel-speed signal whose frequency is representative of the wheel-speed of the wheel. In both embodiments of the sensor, the configuration is relatively simple and thus less expensive. In addition, the sensor is disposed to enable servicing without the need to remove the wheel bearing or even the grease seal.

DESCRIPTION OF THE DRAWINGS

These and other advantages of the present invention will be readily understood with reference to the following specification and attached drawing wherein.

DETAILED DESCRIPTION

The present invention relates to a wheel-speed sensor for use in determining the wheel speed of individual wheels of a vehicle for use with, for example, an anti-lock brake system. Two embodiments of the wheel-speed sensor are disclosed. In one embodiment, the wheel-speed sensor is integrated with a wheel bearing assembly. This embodiment is illustrated in FIGS. 1-11. In a second embodiment, illustrated in FIGS. 12-20, the wheel-speed sensor is integrated with a grease seal which typically inserts into the end of a vehicle axle tube.

Both sensors may be formed as passive sensors, for example, as variable reluctance sensors, or may include an active element, such as a Hall effect device, magneto-resistive elements, or the like, to form an active sensor. Both embodiments include a probe and a target. As will be discussed in more detail below, the probe is serviceable without the need to remove an axle or oil seal, unlike known embodiments, such as the wheel-speed sensor disclosed in U.S. Pat. No. 5,537,032, wherein the wheel-speed sensor is disposed on the back side of the wheel mounting flange and thus requires substantial disassembly of the wheel assembly in order to replace the wheel-speed sensor. Moreover, as will be discussed in more detail below, both embodiments of the wheel-speed sensor are relatively easy to manufacture and thus less expensive to make.

"Between-the-Rows" Wheel Bearing Embodiment

As mentioned above, FIGS. 1-11 relate to a wheel-speed sensor which includes a target, for example, a magnetic exciter ring 20, configured with alternating magnetic poles and a probe or active sensor assembly 22. As best shown in FIG. 2B, the magnetic exciter ring 20 is adapted to be carried by a rotating axle shaft 21 (FIG. 2B) and integrated into a wheel bearing assembly 27 between rolling element rows 23, 25 in a similar manner as disclosed in U.S. Pat. No. 5,537,032. The probe 22 includes a magnetic flux responsive element, which may be an active element, such as a Hall effect element or a magneto-resistance element (MRE). The probe 22 includes a housing formed with one or more cylindrical portions, 24 and 26 (FIG. 1), a flange portion 28 (FIG. 1), and a connector portion 30. As shown in FIG. 2A, the cylindrical portions 24 and 26 are adapted to be inserted into mating holes 32 and 34 in a non-rotating portion of a wheel-bearing housing 36. An annular notch 37 is provided in the cylindrical portion 24. The annular notch 37 (FIG. 1)

is for receiving an O-ring (not shown) to seal the probe 22 into the hole 32 (FIG. 2A) of the wheel bearing housing 36.

Figure 1:
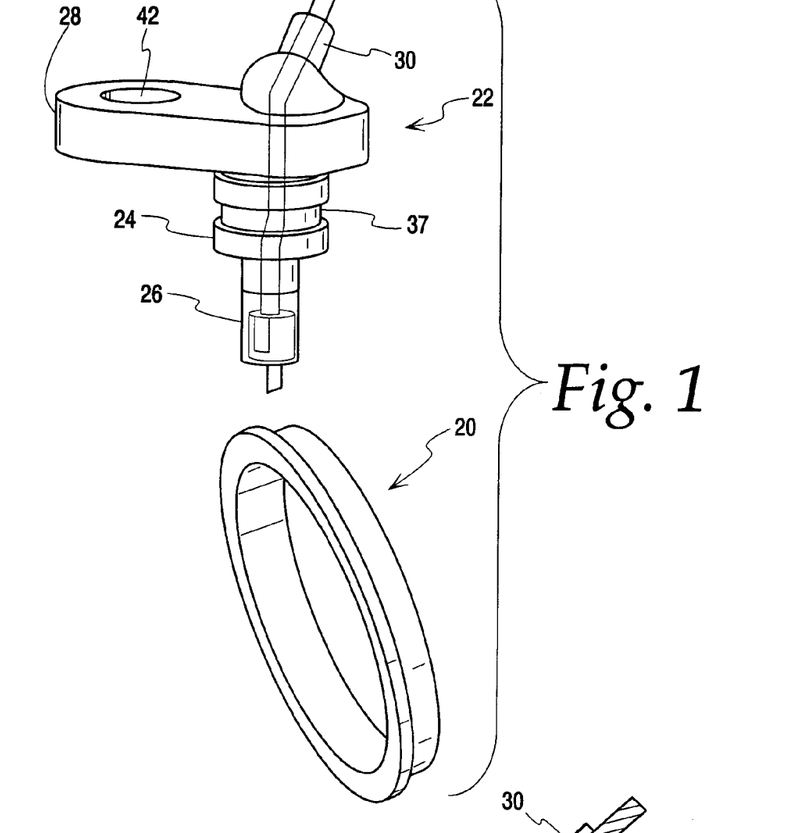
FIG. 1 is an exploded perspective view of a first embodiment of a wheel-speed sensor in accordance with the present invention, which illustrates a probe and a magnetic exciter ring that is adapted to be disposed between the rows of rolling elements in a wheel bearing.
Figure 2A:
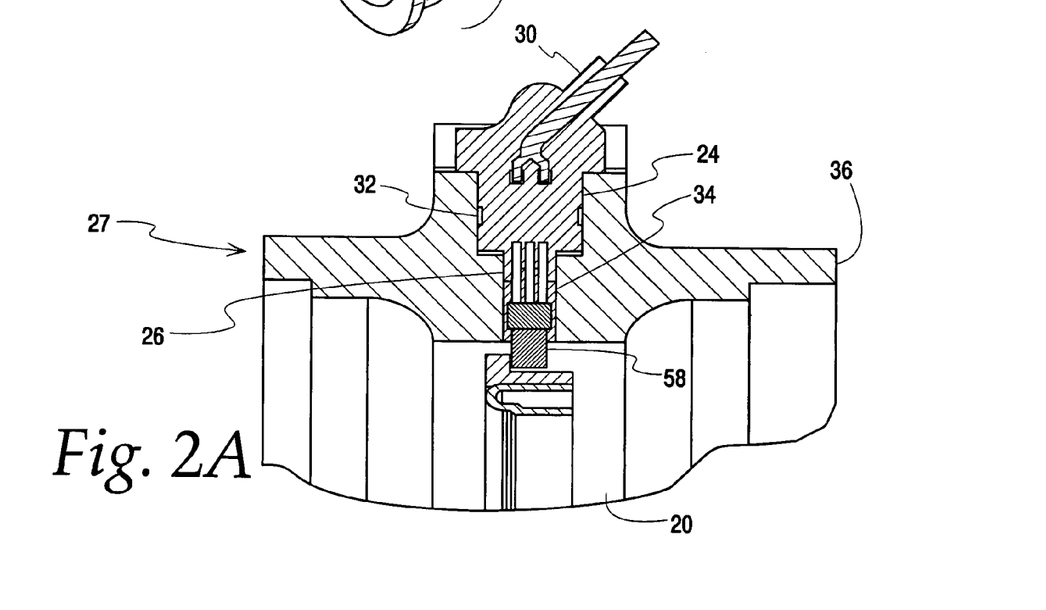
FIG. 2A is a partial sectional view of the wheel-speed sensor illustrated in FIG. 1, shown assembled to a wheel bearing assembly.
Figure 2B:
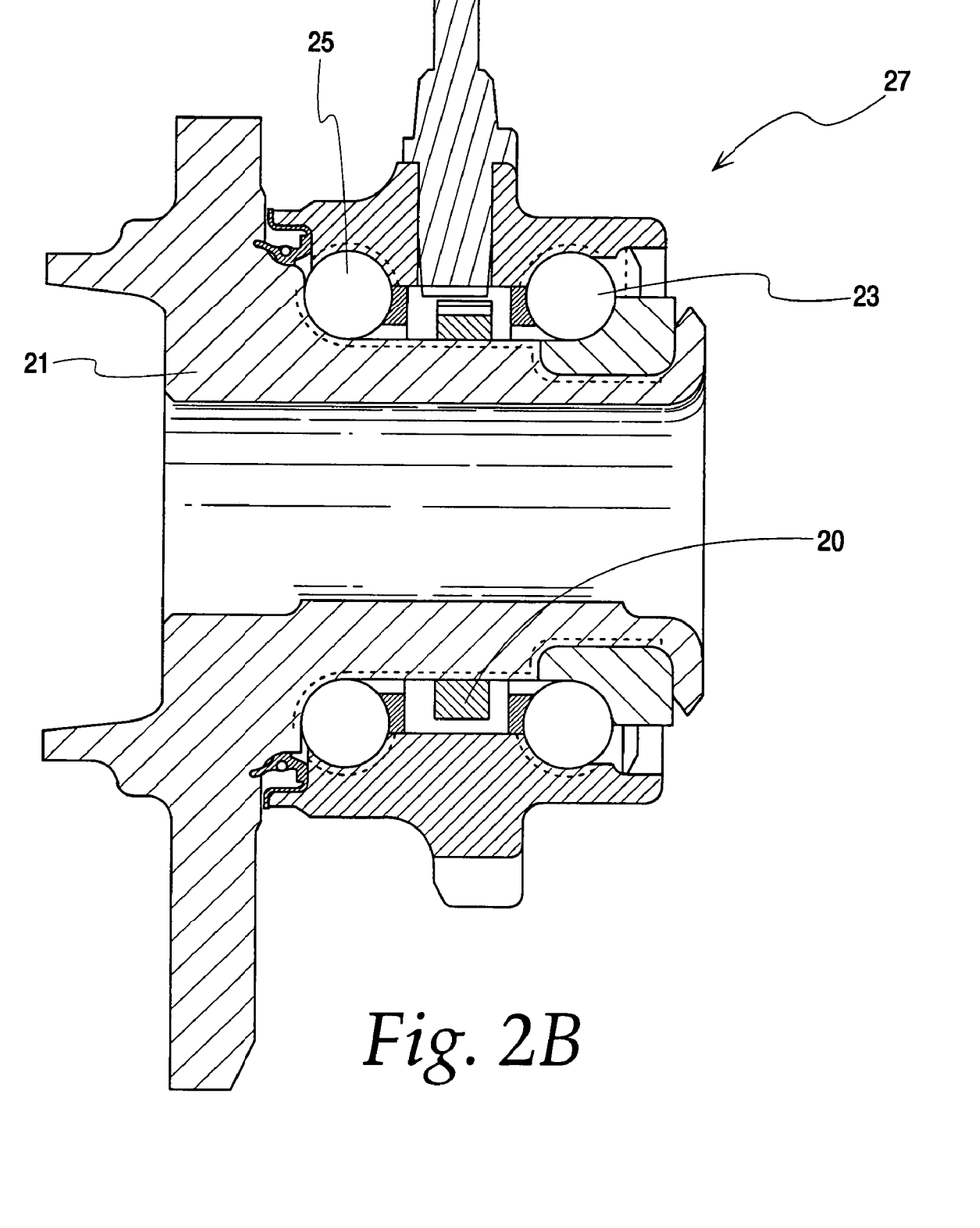
FIG. 2B is a cross sectional view of the wheel-speed sensor illustrated in FIG. 1, assembled to a wheel assembly.

As shown in FIG. 1, the flange portion 28 of the probe 22 includes a through hole 42. The through hole 42 allows the probe 22 to be secured to a stationary, non-moving member of a vehicle wheel assembly (not shown). Unlike other known wheel-speed sensors, for example, as disclosed in U.S. Pat. No. 5,537,032, the probe 22 is disposed in an accessible area of the wheel assembly as shown in FIG. 2B in order to enable replacement of the probe 22 without major disassembly of the wheel assembly as generally shown.

Figure 3:
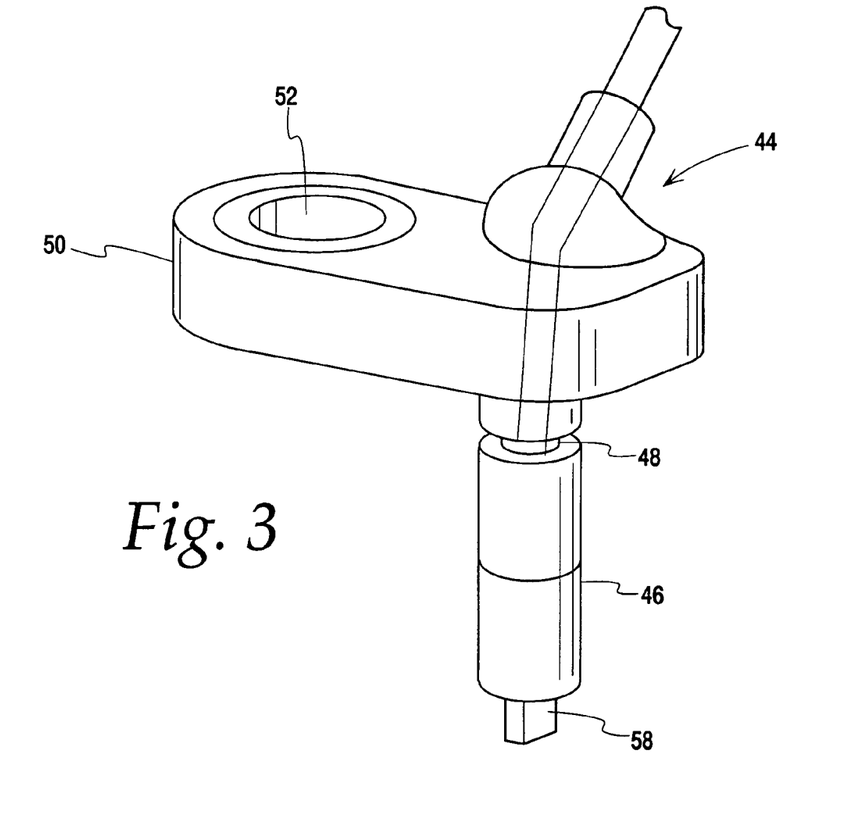
FIG. 3 is an alternate embodiment of a probe which forms a part of the present invention.
Figure 4:
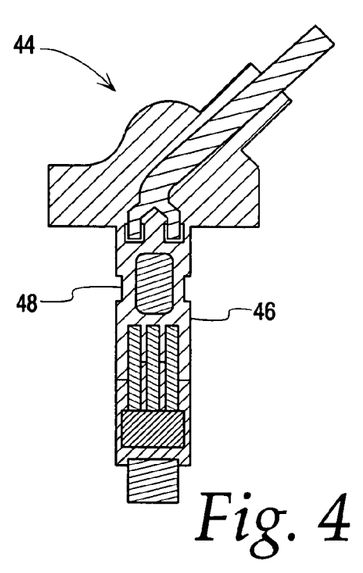
FIG. 4 is a sectional view of one side of the probe illustrated in FIG. 3.

An alternate embodiment of the probe is illustrated in FIG. 3. In this embodiment, the probe, generally identified with the reference numeral 44, includes a single cylindrical portion 46 having a uniform diameter. An annular notch 48 is provided on one end of she cylindrical portion 46 for receiving an O-ring (not shown) for sealing the probe 44 with respect to the wheel bearing housing 36 (FIG. 2A). Similar to the probe 20, the probe 44 includes a flange portion 50 which includes a through-hole 52. As mentioned above, the through-hole 52 allows the probe 44 to be secured to a non-moving member within the vehicle wheel assembly as mentioned above.

Figure 5:
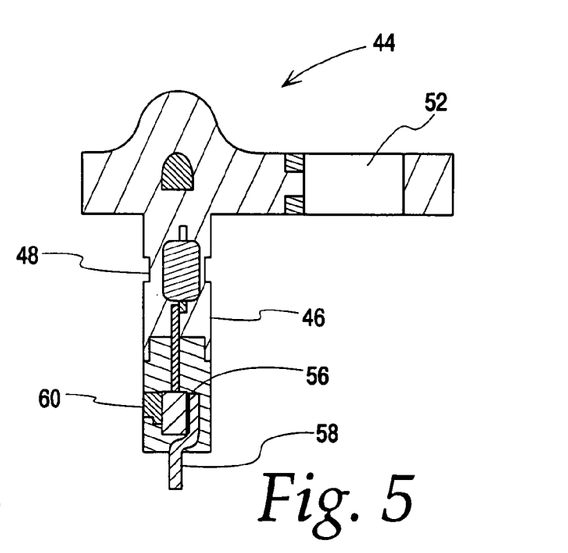
FIG. 5 is a front elevational view of the probe illustrated in FIG. 3.

The magnetic exciter ring 20 is formed with multiple magnetic pole pairs which may be equally positioned around its circumference. A magnetic circuit is formed from each magnetic pole to a magnetic ground formed from the metallic mass of the bearing housing 36 (FIG. 2A) or axle tube. More particularly, the probe 20 or 44 includes a magnetic flux responsive element, which may be an active element 56, for example, a Hall effect device or magneto-resistive element (MRE), or the like. The active element 56 is sandwiched between a pair of pole pieces. One pole piece 58 extends in a radial direction outwardly from the cylindrical portion 46 of the probe 44, adjacent the magnetic exciter ring 20, for example, as shown in FIG. 5. The other pole piece 60 acts as a magnetic shunt to shunt one side of the active element 56 to the wheel bearing housing 36 (FIG. 2A) or axle tube. With such a configuration, as the magnetic field changes direction as each magnetic pole is serially positioned under the pole piece 58, a constantly reversing magnetic field surrounds the active element 56. As the flux level passes through minimum levels, for example, +30 gauss and then −30 gauss, the active sensing element 56 switches from an on state to an off state, creating a square wave output signal. The frequency of the square wave output signal is a function of the speed of the magnetic exciter ring 20.

The principles of the present invention may also be used to form a passive sensor, such as a variable reluctance sensor. In this embodiment, a coil of fine magnet wire (not shown) may be wound around the pole piece 58 and used in place of the active sensor element 56. In operation, as the magnetic field changes directions, a small alternating current is generated in the coil. The frequency of the alternating current is proportional to the vehicle wheel-speed.

Various embodiments of the magnetic exciter ring 20 are illustrated in FIGS. 6A-6E. The differences in each of these embodiments relates to the configuration of the outer diameter. In particular, the first embodiment, generally identified with the reference numeral 60, is formed with a relatively flat cross section.

Figures 6A, 6B, 6C:
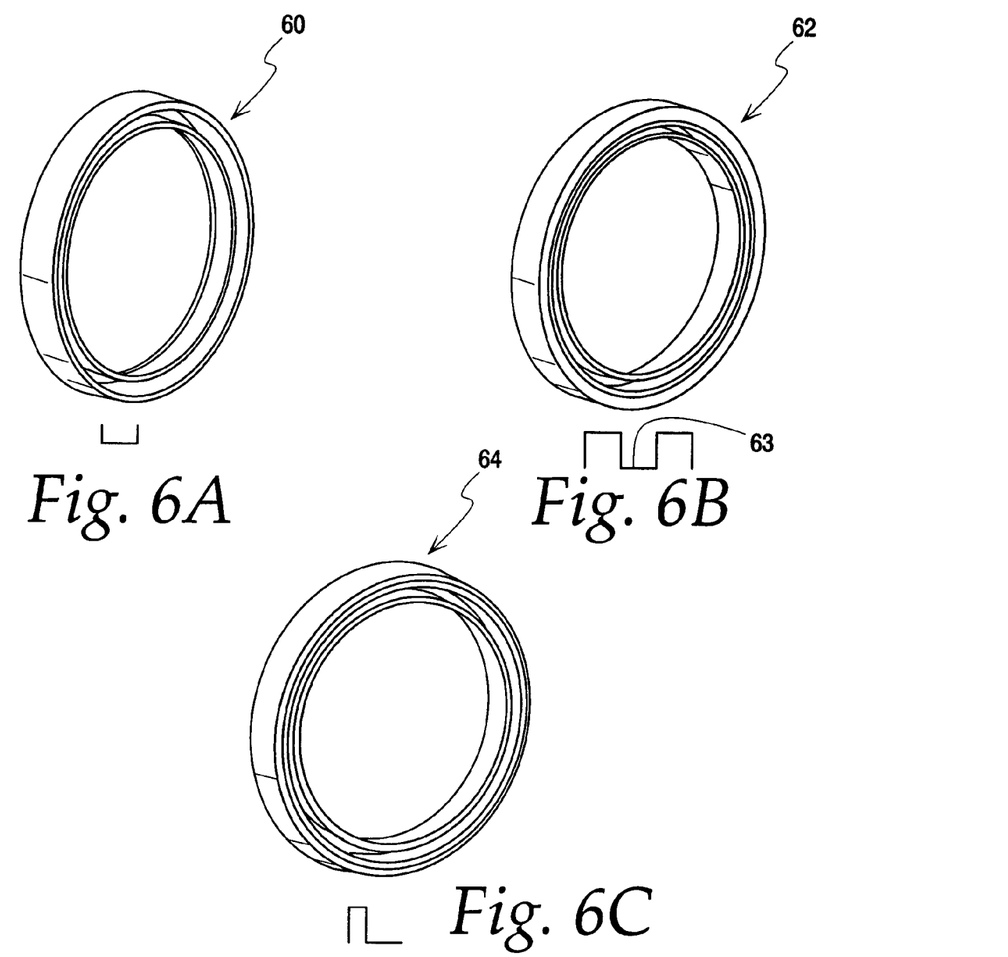
FIG. 6A illustrates one embodiment of a magnetic exciter ring, formed with a flat cross section, for use with the present invention.
FIG. 6B is an alternate embodiment of a magnetic exciter ring formed with a U-shaped cross section, for use with the present invention.
FIG. 6C is another alternate embodiment of a magnetic exciter ring, formed with an L shaped cross section, for use with the present invention.

A second embodiment of the magnetic exciter ring, generally identified with the reference numeral 62, is formed with a U-shaped cross section. The U-shaped cross section is formed with a circumferential groove 63 which may be centered in an axial direction along the outer diameter of the magnetic exciter wheel 62. With such a configuration, magnetic flux emanates from all three surfaces of the individual magnetic poles created by the circumferential groove 63. This flux path extends through the gaps between these surfaces and the axial sides and end of the pole piece 58, resulting in contour coupling of the magnetic flux between the magnetic exciter ring 62 and the pole piece 58, which couples more available flux to actuate the sensing element which promotes relatively more compact designs. Alternatively, the sensor pole piece 58 can be notched and the magnetic exciter wheel 62 include a contour-coupled extension for passing through the notch in the pole piece 58.

The magnetic exciter wheel 62, formed with a U-shaped cross-section, provides relatively more stable magnetic properties and is less sensitive to the relative radial location of the sensor module 22, 24 relative to the other embodiments of the magnetic exciter wheel. The reason for this is because the level of magnetic flux available to actuate the active device is a function of both the radial and axial air gap. In the case of a magnetic exciter wheel 62 with a U-shaped cross section, the two axial air gaps tend to compensate for one another. In other words, as one axial air gap increases, the other air gap decreases, with the net result of a relatively constant flux coupling in the axial direction.

FIG. 6C illustrates an alternate embodiment of magnetic exciter wheel configuration, generally identified with the reference numeral 64. In this configuration, the cross section of the magnetic exciter wheel 64 is configured With an L-shaped cross section and provides coupling along one axial side.

Figure 6D:
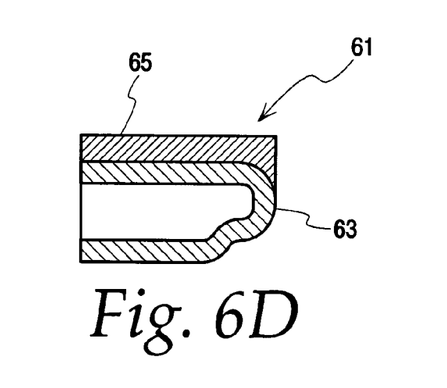
FIG. 6D is another alternate embodiment of a magnetic exciter ring, formed with a C-shaped cross section, for use with the present invention.
Figure 6E:
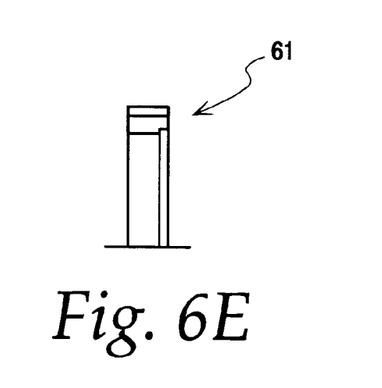
FIG. 6E is a partial elevational view of the magnetic exciter ring illustrated in FIG. 6D.

Another alternate embodiment of the magnetic exciter ring is illustrated in FIGS. 6D and 6E and generally identified with the reference numeral 61. In this embodiment, the magnetic exciter wheel 61 is formed from, for example, a metal stamping 63 which acts as a carrier which carries a molded rubber or polymeric magnet, which are well known in the art. The carrier 63 is formed with a c-shaped cross section. The molded magnet 65 is formed with, for example, forty-seven (47) pole pairs spaced around its circumference, for example, equally spaced.

Figure 7:
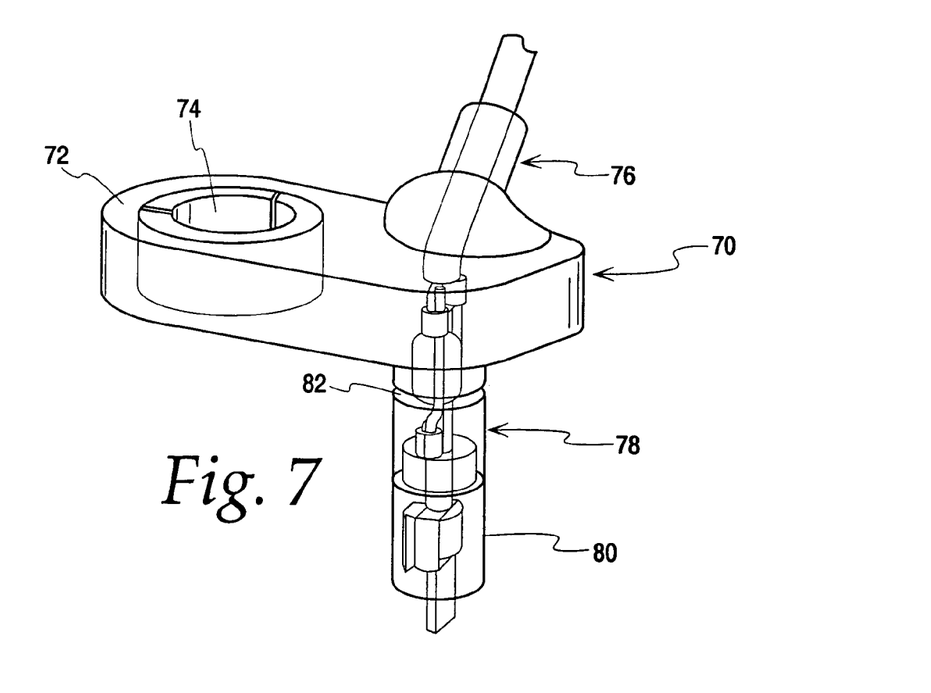
FIG. 7 is a perspective view of an embodiment of a modular two-piece probe for use with the present invention.
Figure 8:
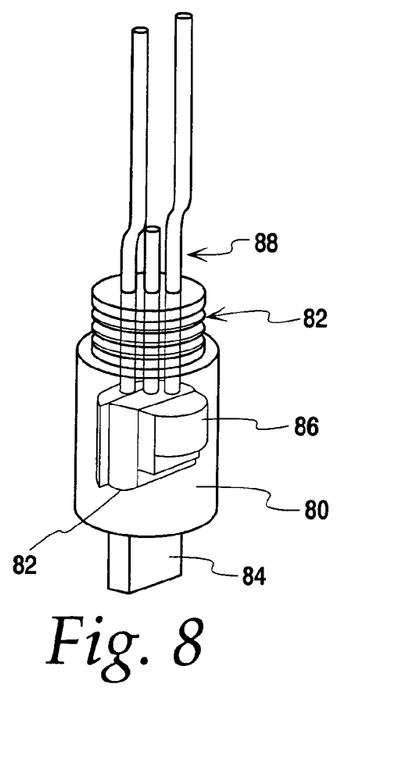
FIG. 8 is a perspective view of a modular portion of the probe illustrated in FIG. 7.
Figure 9:
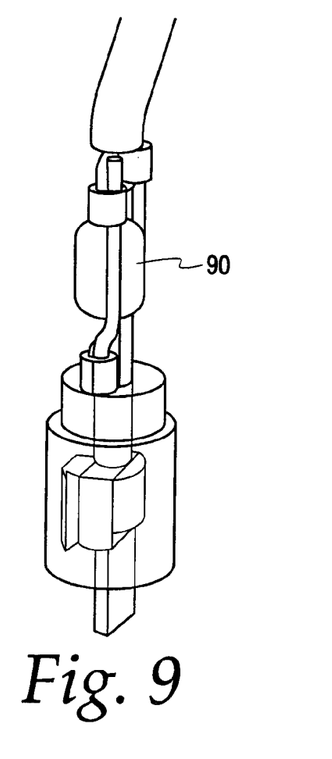
FIG. 9 is similar to FIG. 8 but illustrating a capacitor assembled to the probe.
Figure 10:
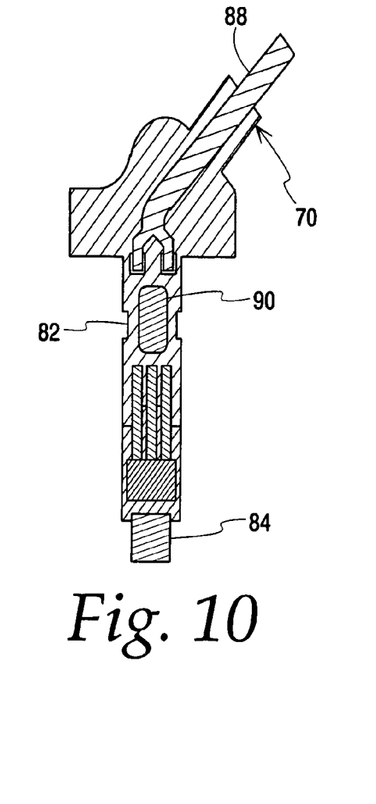
FIG. 10 is a front elevational sectional view of the probe illustrated in FIG. 7.
Figure 11:
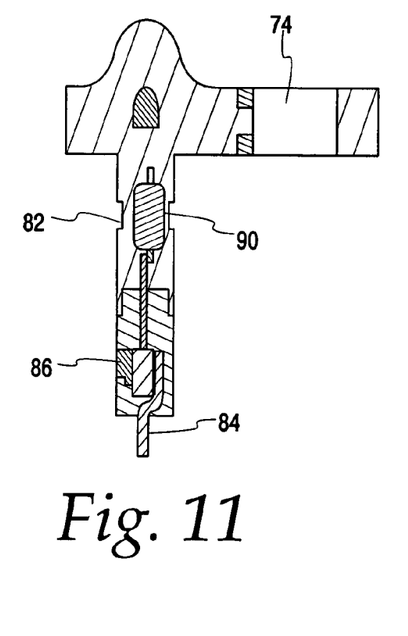
FIG. 11 is a side elevational sectional view of the probe illustrated in FIG. 7.

FIGS. 7-11 illustrate an alternate embodiment of the invention of a modular probe formed in multiple sections. Referring first to FIG. 7, this probe, generally identified with the reference numeral 70, includes a flange portion 72 with a through-hole 74, and a connector portion 76. In this embodiment of the invention, the portion of the probe 70 which fits into the hole 32 (FIG. 2A) within a wheel bearing housing 36 may be formed from multiple sections, for example, two cylindrical sections identified with the reference numerals 78 and 80 (FIGS. 7-9). The cylindrical section 78 may be formed as a hollow, cylindrical section which includes an annular notch 82 adjacent one end. As discussed above, the annular notch 82 is adapted to receive an O-ring (not shown) to seal the sensor module 70 with respect to the wheel-bearing housing 36 (FIG. 2A). As best shown in FIG. 8, the cylindrical portion 80 may be formed as a removable portion and may be formed with threads 82 which allow it to be screwed into corresponding threads (not shown) on the other cylindrical portion 78. The cylindrical portion 80 may be injection-molded with a magnetically conductive material around an active sensor 82 and sandwiched between an extending pole piece 84 and a shunt pole piece 86. The active sensor, may be, for example, a bi-polar Hall effect device. The cylindrical portion 80 is formed so that the sensor leads, generally identified with the reference numeral 88, extend outwardly from a top portion of the cylindrical portion 80. One lead may be serially coupled to a capacitor 90. The leads 88 and the capacitor 90, in turn, are adapted to be received into the cylindrical portion 78 which may be integrally formed with the flange portion 72 and connection portion 76. The leads 88 are adapted to extend outwardly from the connector 76.

Integral Wheel-Speed Grease Seal Sensor

An alternate embodiment of the invention is illustrated in FIGS. 12-18. This embodiment includes a magnetic exciter ring adapted to he attached to a rotating axle shaft. The wheel-speed sensor includes a two-piece stator that also functions as a grease seal which concentrates flux from the rotating multiple pole exciter ring. A coil of magnet wire may be used as the sensor and connect the two stator pieces forming a flux bridge. As magnetic flux is conducted across the flux bridge, the magnetic circuit is completed from a North magnetic pole to an adjacent South magnetic pole. As this happens, the magnetic flux surrounding the flux bridge induces an electrical current in the coil. As the magnetic poles on the magnetic exciter ring switch polarity relative to the stator, the magnetic flux surrounding the flux bridge collapses and rebuilds in an opposite direction, generating an electrical current in the flux bridge in an opposite direction. Thus, as the magnetic exciter ring rotates, an alternating current is generated in the coil with a frequency that is a function of the speed of the rotating exciter wheel and the number of magnetic poles positioned around the circumference of the magnetic exciter wheel.

Alternatively, the sensor may be formed with active sensor elements, such as a bipolar Hall effect device or a magneto-resistive element (MRE). In these embodiments, the sensor element is positioned between two magnetic flux concentrators on the two-piece stator. As the multiple pole magnetic exciter ring rotates, one magnetic pole is disposed relative to one flux concentrator while an opposite polarity pole is positioned relative to the other flux concentrator. By positioning a magnetic flux active device between the two flux concentrators, the rotating multiple pole exciter ring generates a constantly reversing magnetic field at the pole pieces which causes the active device disposed therebetween to generate a square wave having a frequency proportional to the speed of the rotating magnetic exciter ring.

Figure 12:
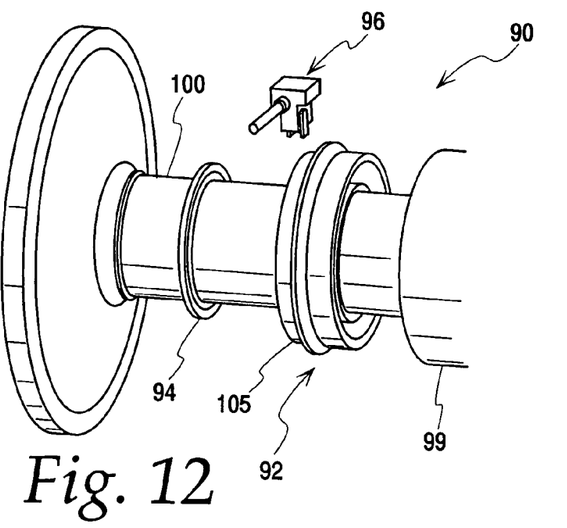
FIG. 12 is an alternate embodiment of the wheel-speed sensor which is incorporated into an oil seal, shown partially assembled onto a wheel axle.
Figure 13:
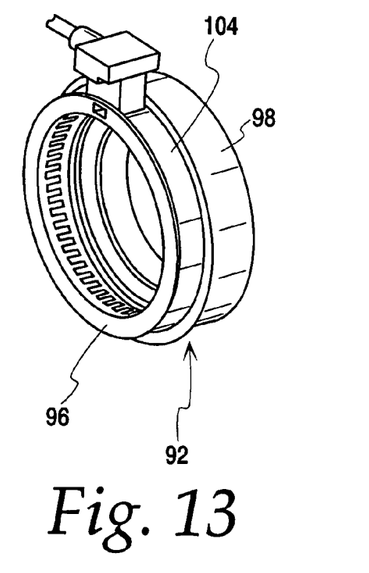
FIG. 13 is a perspective view of the wheel-speed sensor illustrated in FIG. 12.

The embodiment illustrated in FIGS. 12-13, similar to the embodiment illustrated in FIGS. 1-11, can be serviced without disassembly of the wheel assembly. The embodiment disclosed herein also functions as a grease seal adapted to be inserted into the end of an axle tube and is thus easily serviceable. Moreover, the simplicity of this wheel-speed sensor reduces manufacturing cost.

Referring to FIGS. 12 and 13, the wheel-speed sensor in accordance with this aspect of the invention which forms an integral oil seal is generally identified with the reference numeral 90. The wheel-speed sensor 90 includes a two-piece stator 92, a magnetic exciter ring 94, and a probe 96. The magnetic exciter ring 94 includes a plurality of magnetic pole pairs which may be equally spaced around its periphery.

Figure 19A:
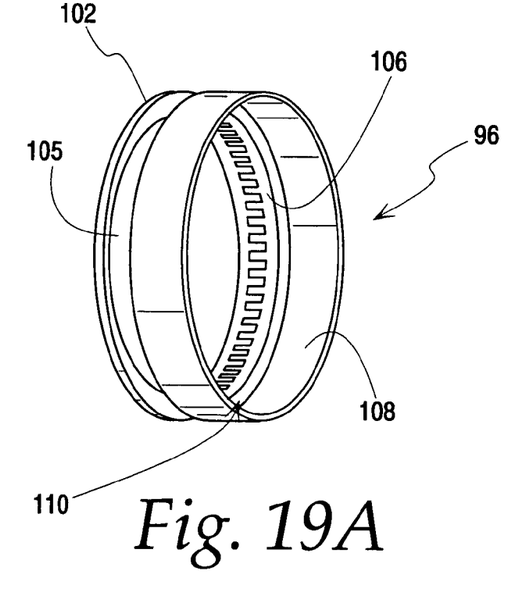
FIG. 19A is a perspective view of a toothed wheel portion of a two piece stator in accordance with the embodiment of the invention illustrated in FIGS. 12 and 13.
Figure 19B:
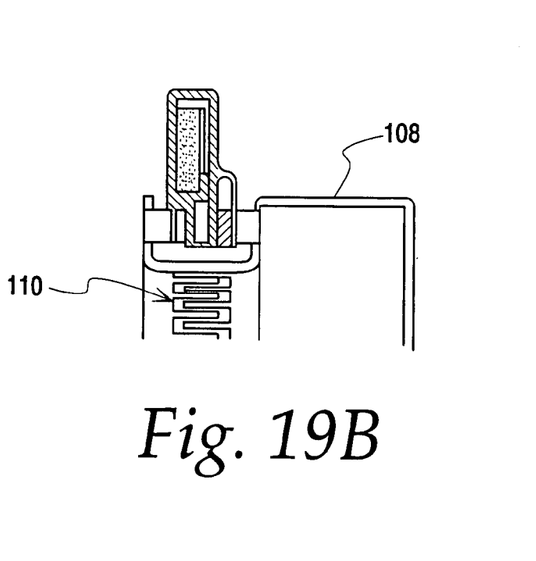
FIG. 19B is a sectional view of the toothed wheel stator portion illustrated in FIG. 19A.
Figure 20A:
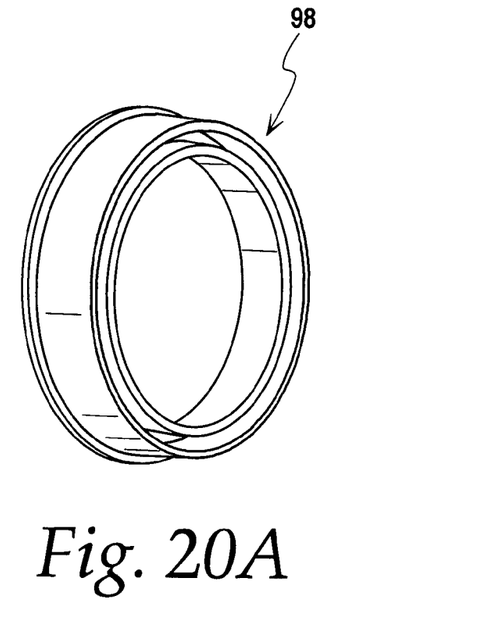
FIG. 20A is a perspective view of the grease seal portion of the two piece stator in accordance with the embodiment of the invention illustrated in FIGS. 12 and 13.
Figure 20B:
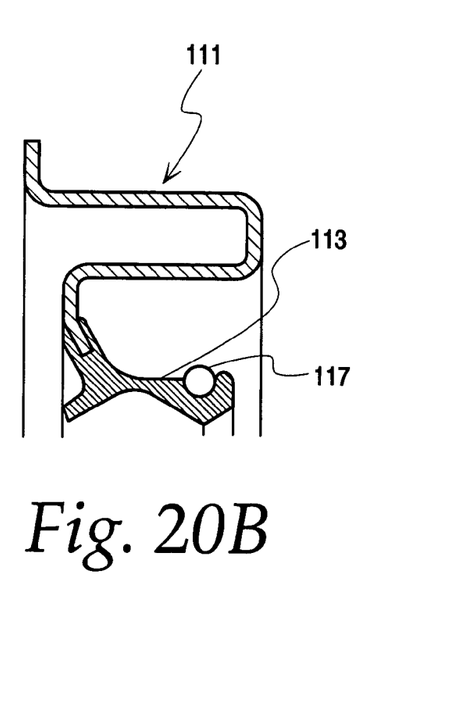
FIG. 20B is a sectional view of the grease seal portion illustrated in FIG. 20A.

The two piece stator 92 includes a toothed wheel portion 96 (FIGS. 19A and 19B) and a grease seal portion 98 (FIGS. 20A and 20B). As best shown in FIG. 19A, the toothed wheel portion 96 includes an outer cylindrical portion 106 and an inner cylindrical portion 108. The inner cylindrical portion 108 is stamped with a number of teeth, generally identified with the reference numeral 110. The inner cylindrical portion 108 is formed with a slightly larger diameter as best shown in FIG. 19B. The toothed wheel portion 96 also includes a pair of pole pieces 102, 104 (FIG. 16) axially spaced apart in an annular groove 105, formed on the outer cylindrical portion 106 projecting radically outwardly therefrom.

Figure 16:
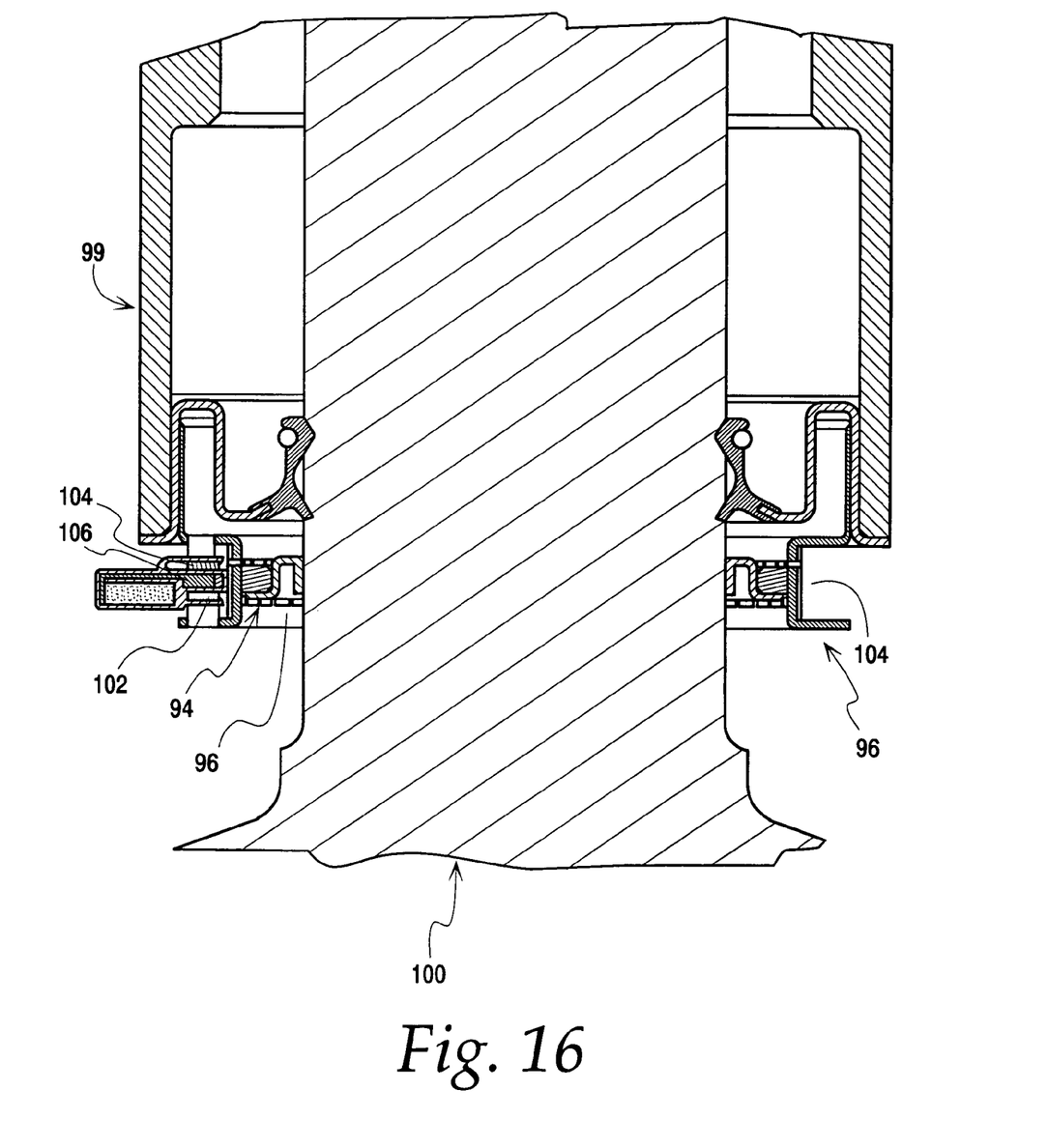
FIG. 16 is a partial sectional view of the wheel-speed sensor illustrated in FIGS. 12 and 13 fully assembled to a vehicle axle and axle tube.

As best shown in FIG. 20B, the grease seal portion 98 is formed with a flange portion 111, a spring retainer 113 and a rubber seal 117. The spring retainer 113 is used to secure the grease seal portion 98 around an axle 100. The grease seal portion 92 and the flange portion 111 may be coupled together by various techniques including molding. The two piece stator 92 is inserted into the end of an axle tube 99 as best shown in FIG. 16. The magnetic exciter wheel 94 (FIG. 12) is disposed on the axle 100, for example, by press fit, spaced away from one end. The axle 100 is then inserted into the axle tube 99 as shown in FIG. 12, which illustrates partial assembly of the axle 100 into the axle tube 99. When the axle 100 is fully inserted into axle tube 99, as shown in FIG. 16, the magnetic exciter ring 94 is concentric with the teeth 110 on the inner cylindrical portion 108, as shown.

In operation as the magnetic exciter ring 94 rotates, it alternately positions like magnetic poles under the teeth of the pole pieces 102 and 104, disposed in the annular groove 105 on the two piece stator 94, creating a flux bridge. Placement of the probe 96 between the two pole pieces, results in alternating magnetic polarities at the flux concentrators 102 and 104. By disposing the active sensor element between the flux concentrators 102 and 104, rotation of the magnetic exciter ring 94 causes an active device, such as a bi-polar Hall effect device, to switch and generate a square wave output having a frequency which is representative of the speed of the rotating ring.

Figure 14A:
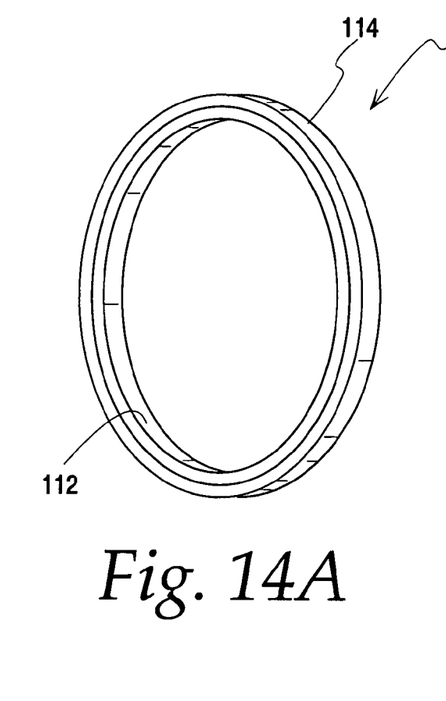
FIG. 14A is a perspective view of a magnetic exciter ring illustrated in FIGS. 12 and 13.
Figure 14B:
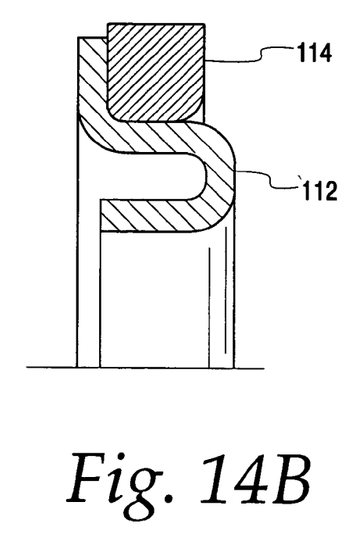
FIG. 14B is a partial sectional view of the magnetic exciter ring illustrated in FIG. 14A.
Figure 15A:
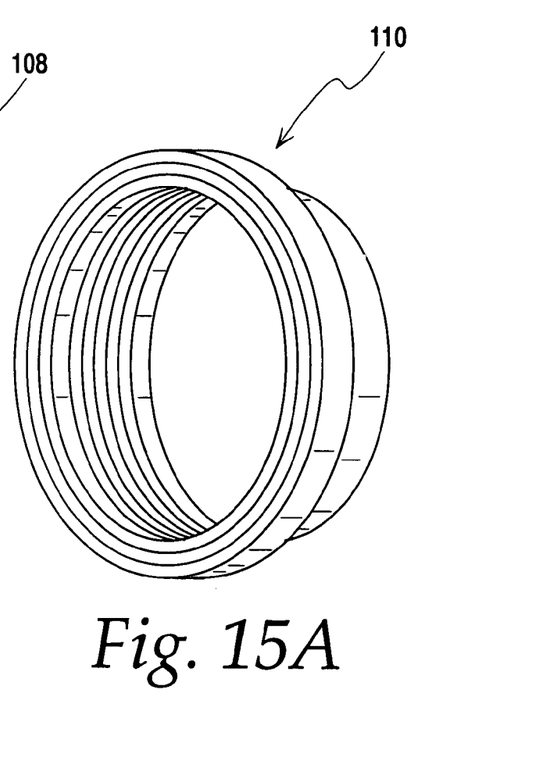
FIG. 15A is a perspective view of an alternate embodiment of a magnetic exciter ring illustrated in FIGS. 12 and 13.
Figure 15B:
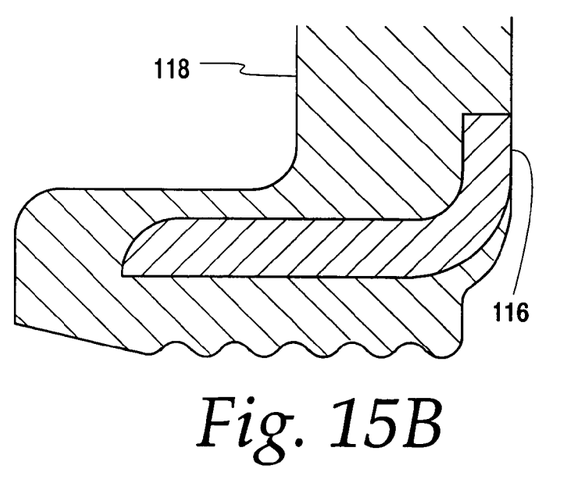
FIG. 15B is a partial sectional view of the magnetic exciter ring illustrated in FIG. 15A.

FIGS. 14A, 14B and 15A, 15B illustrate two exemplary embodiments of a magnetic exciter ring for use with the embodiment illustrated in FIGS. 12 and 13. Referring first to FIGS. 14A and 14B, the magnetic exciter ring 108 includes a carrier 112, for example, a metal stamping with a C-shaped cross section and an injection molded or elastomeric/ferrite magnet ring 114 with a multiple pole magnetic pattern formed on its outer diameter. The magnetic exciter ring 110 illustrated in FIGS. 15A and 15B also includes a carrier 116 and a magnet 118. The exciter rings 108 and 110 also act as a protective slinger for the oil seal.

Figure 17:
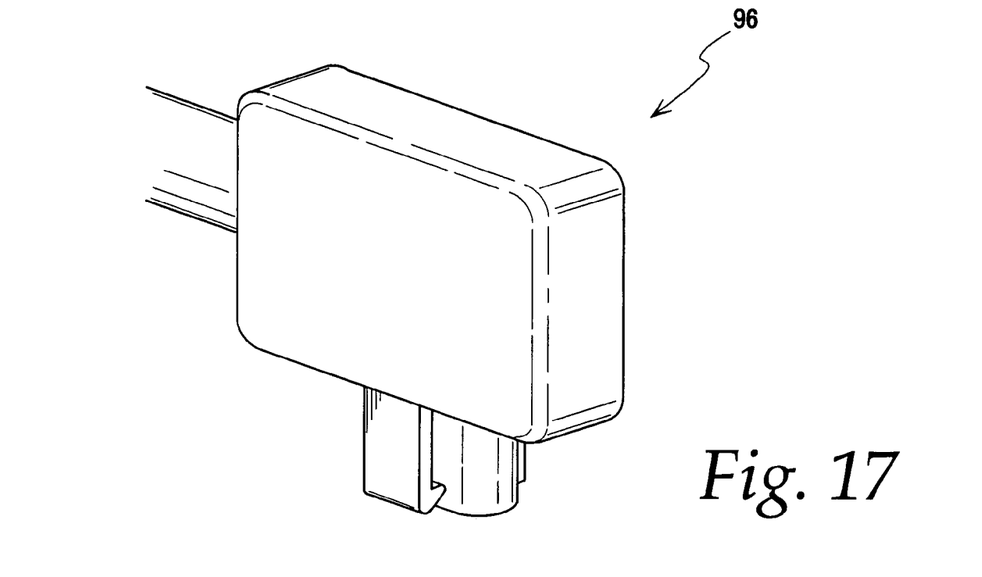
FIG. 17 is a perspective view of a probe module for use with the wheel-speed sensor illustrated in FIGS. 12 and 13.
Figure 18:
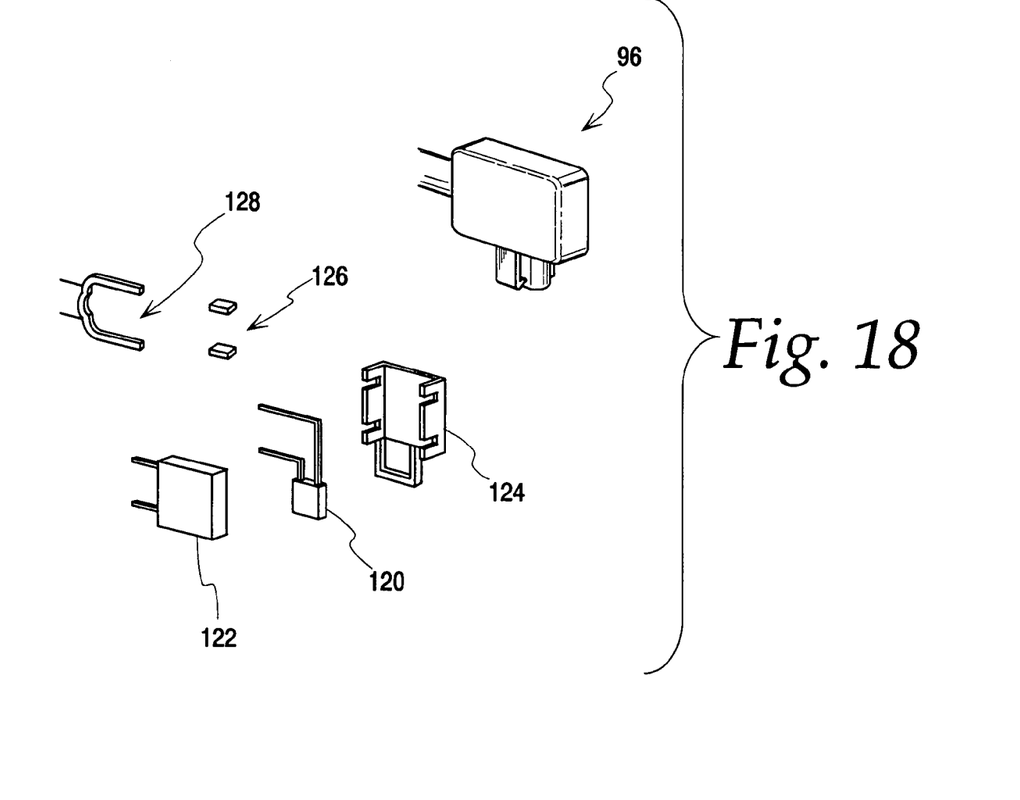
FIG. 18 is an exploded perspective view of the probe module illustrated in FIG. 17.

FIGS. 17 and 18 illustrate the probe 96. In particular, FIG. 17 illustrates a perspective view of an assembled probe, while FIG. 18 illustrates an exploded perspective. As shown, the probe 96 may include a Hall effect device 120, a capacitor 122, a carrier 124, a pair of splice bands 126 for connection to a cable harness 128.

Obviously, many modifications and variations of the present invention are possible in light of the above teachings. Thus, it is to be understood that, within the scope of the appended claims, the invention may be practiced otherwise than as specifically described above.

The invention claimed is:
1. A wheel-speed sensor comprising:
a magnetic exciter ring disposed between adjacent rolling element rows, wherein the magnetic exciter ring includes multiple North and South magnetic pole pairs spaced around the ring, the magnetic exciter ring configured to be carried by a rotating axle portion of a vehicle; and
a probe disposed adjacent an outer peripheral, surface of the magnetic exciter ring, the probe including a magnetic flux responsive element, the probe configured to be rigidly mounted adjacent the outer peripheral surface of the magnetic exciter ring, wherein the probe is formed with a cylindrical portion, a flange portion, and a terminal portion, and wherein the cylindrical portion is formed in two sections:
a first section formed separately from the rest of the probe, which includes a Hall effect device molded into a molded cylindrical housing with a pole piece extending outwardly from one end and leads from the Hall effect device extending outwardly from an opposing end; and
a second section formed as a hollow cylinder for receiving the extending leads and coupling to the first section.

2. The wheel-speed sensor as recited in claim 1, wherein the magnetic flux responsive element includes an active device.

3. The wheel-speed sensor as recited in claim 2, wherein the active device is the Hall effect device.

4. The wheel-speed sensor as recited in claim 3, further including a first pole piece coupled to one side of the Hall effect device and adapted to be disposed adjacent the outer peripheral surface of the magnetic exciter ring and a second pole piece disposed adjacent an opposing side of the Hall effect device.

5. The wheel-speed sensor as recited in claim 4, wherein the probe is configured to be received in a hole in the wheel bearing housing adjacent the magnetic exciter ring and wherein the second pole piece acts as a magnetic shunt to form a magnetic circuit between the first pole piece and the wheel bearing housing when the probe is assembled thereto.

6. The wheel-speed sensor as recited in claim 1, wherein the magnetic exciter ring is formed with a flat cross section.

7. The wheel-speed sensor as recited in claim 1, wherein the magnetic exciter ring is formed with a U-shaped cross section.

8. The wheel-speed sensor as recited in claim 1, wherein the magnetic exciter ring is formed with a L-shaped cross section.

9. The wheel-speed sensor as recited in claim 1, where the magnetic exciter ring is formed with a C-shaped cross section.

10. The wheel-speed sensor as recited in claim 1, wherein the cylindrical portion includes an annular notch for receiving an O-ring.

11. A wheel-speed sensor comprising:
a magnetic exciter ring disposed within a wheel bearing housing, wherein the magnetic exciter ring includes multiple North and South magnetic pole pairs spaces around the ring, the magnetic exciter ring configured to be carried by a rotating axle portion of a vehicle; and
a probe disposed adjacent an outer peripheral surface of the magnetic exciter ring, wherein the probe is adapted to be mounted to an exterior surface of the wheel bearing housing, wherein the probe is formed with a cylindrical portion that is formed in two sections, a first section, formed separately from the rest of the probe, which includes a Hall effect device molded into a molded cylindrical housing with a pole piece extending outwardly from one end and leads from the Hall effect device extending outwardly from an opposing end; and a second section formed as a hollow cylinder for receiving the extending leads and coupling to the first section.

12. The wheel-speed sensor as recited in claim 11, wherein the probe extends through the wheel bearing housing to a location proximate to the magnetic exciter ring.

13. The wheel-speed sensor as recited in claim 12, wherein the location proximate to the magnetic ring is between adjacent rolling element rows within the wheel bearing housing.

\* \* \* \* \*